(12) United States Patent
Kara et al.

(10) Patent No.: US 11,034,533 B2
(45) Date of Patent: Jun. 15, 2021

(54) SYSTEM FOR CONVEYING ARTICLES

(71) Applicant: SOLYSTIC, Bagneux (FR)

(72) Inventors: Karim Kara, Chabeuil (FR); Alain Danjaume, Besayes (FR); Eric Moullard, Guilherand Granges (FR)

(73) Assignee: SOLYSTIC, Bagneux (FR)

(*) Notice: Subject to any disclaimer, the term of this patent is extended or adjusted under 35 U.S.C. 154(b) by 0 days.

(21) Appl. No.: 16/754,157

(22) PCT Filed: Dec. 20, 2019

(86) PCT No.: PCT/EP2019/086832
§ 371 (c)(1),
(2) Date: Apr. 7, 2020

(87) PCT Pub. No.: WO2020/128065
PCT Pub. Date: Jun. 25, 2020

(65) Prior Publication Data
US 2020/0339365 A1    Oct. 29, 2020

(30) Foreign Application Priority Data
Dec. 21, 2018   (FR) ..................................... 1873976

(51) Int. Cl.
*B65G 47/82*        (2006.01)
*B62B 3/14*         (2006.01)
(Continued)

(52) U.S. Cl.
CPC ................ *B65G 47/90* (2013.01); *B62B 3/14* (2013.01); *B62B 5/0033* (2013.01); *B65G 47/82* (2013.01);
(Continued)

(58) Field of Classification Search
CPC .... B65G 1/137; B65G 47/82; B65G 47/8892; B65G 47/90; B62B 3/14; B62B 5/0033
(Continued)

(56) References Cited

U.S. PATENT DOCUMENTS 4,508,484 A     4/1985  Heiz
5,082,415 A *   1/1992  Hayashi ................. B65G 67/20
                                                    414/343
(Continued)

FOREIGN PATENT DOCUMENTS

DE       102015001540 A1    8/2015
FR           3049481 B1     3/2018
(Continued)

OTHER PUBLICATIONS

Search Report dated Nov. 7, 2019 issued by the French Patent Office in corresponding Application No. FR 1873976.
(Continued)

*Primary Examiner* — Douglas A Hess
(74) *Attorney, Agent, or Firm* — Ware, Fressola, Maguire & Barber LLP

(57) ABSTRACT

The invention relates to a system (1) for conveying articles (3), which system comprises an article conveyor (2) extending from an upstream end (4) to a downstream end (5), and a motor-driven shuttle trolley (6) having an article carrier deck (7) and designed to dock with said ends of the conveyor so as to transfer an article between the trolley and the conveyor. The conveyor is a gravity conveyor under which a ramp (12) extends, and the trolley is suitable for travelling under the conveyor and is provided with a lever (11) that is mounted to move vertically relative to the deck and that is designed to co-operate with the ramp while the trolley is moving under the conveyor so that, by following the ramp, the lever moves between a retracted position in which it is
(Continued)

retracted under the conveyor and a deployed position in which it projects above the conveyor so as to drive an article along the conveyor. The method of matching digital images of the same article in a data processor unit comprises the steps of: transforming each digital image of an article into a local divergence topographic map of the luminance gradient vector field; detecting singularities or extrema of local divergence in the luminance gradient vector field, such singularities corresponding to points of interest in said digital image; and, for each detected point of interest, encoding the values for the singularity of the gradient field that are located on a plurality of concentric rings centered on the point of interest so as to derive a digital data vector (210); and transforming said vector into a digital hash key (220) by means of a family of hash functions of the cosine Locality-Sensitive Hashing (LSH) type.

12 Claims, 2 Drawing Sheets

(51) Int. Cl.
*B65G 47/90* (2006.01)
*B62B 5/00* (2006.01)
*B65G 47/88* (2006.01)

(52) U.S. Cl.
CPC ...... *B65G 47/8892* (2013.01); *B65G 2207/36* (2013.01)

(58) Field of Classification Search
USPC ............ 198/550.01, 597; 14/338, 389
See application file for complete search history.

(56) References Cited

U.S. PATENT DOCUMENTS

| | | | | |
|---|---|---|---|---|
| 6,162,004 | A * | 12/2000 | Hanakawa | B62B 3/002 280/79.11 |
| 6,543,983 | B1 * | 4/2003 | Felder | B23Q 7/10 414/331.07 |
| 7,153,081 | B2 * | 12/2006 | Watanabe | B66F 9/063 414/507 |
| 7,618,224 | B2 * | 11/2009 | Barry | B66C 1/663 414/337 |
| 8,989,918 | B2 * | 3/2015 | Sturm | G05D 1/021 701/2 |
| 9,078,967 | B2 * | 7/2015 | Oerter | A61M 1/1656 |
| 9,517,899 | B2 * | 12/2016 | Watt | B65G 49/00 |
| 10,059,519 | B2 * | 8/2018 | Hofmann | B65G 1/0492 |
| 10,399,776 | B2 * | 9/2019 | Issing | B65G 1/1373 |
| 10,513,394 | B2 * | 12/2019 | Borders | B65G 67/22 |

FOREIGN PATENT DOCUMENTS

| | | |
|---|---|---|
| JP | H09118431 A | 5/1997 |
| JP | 2992414 B2 | 12/1999 |
| JP | 2000247412 A | 9/2000 |
| JP | 5245484 B2 | 7/2013 |

OTHER PUBLICATIONS

Corresponding PCT International Search Report and Written Opinion dated Mar. 6, 2020 issued by the European Patent Office in Application No. PCT/EP2019/086832, 14 pages.

* cited by examiner

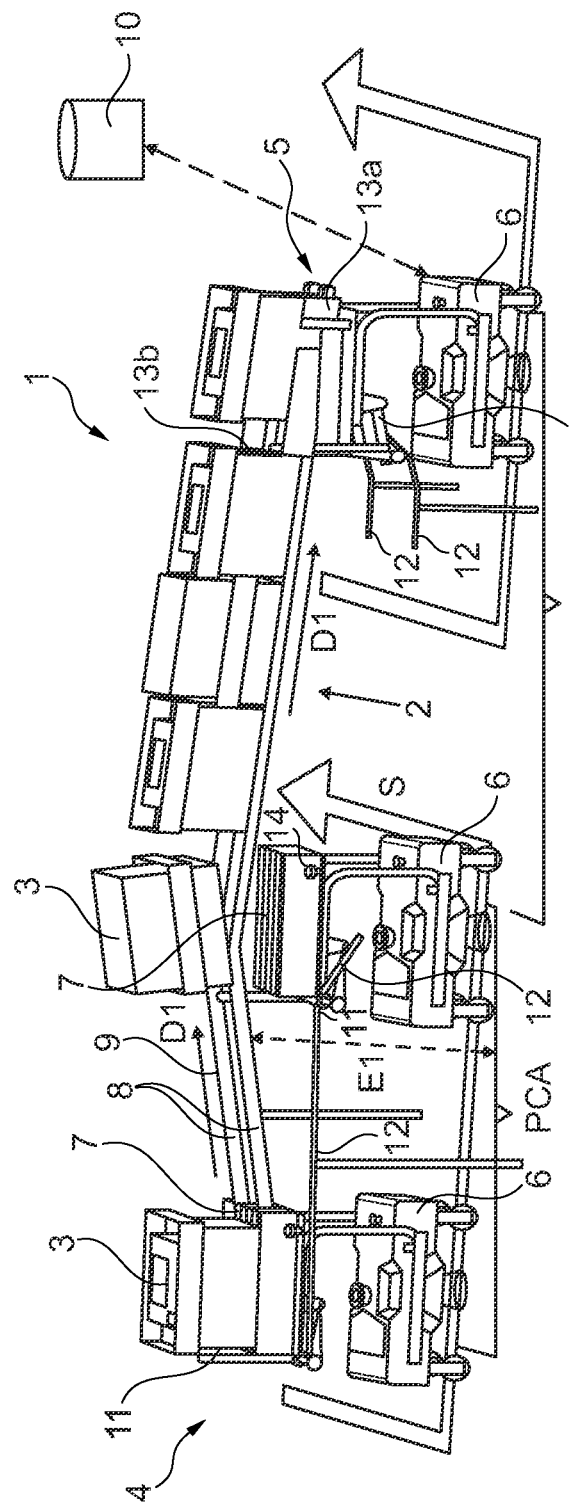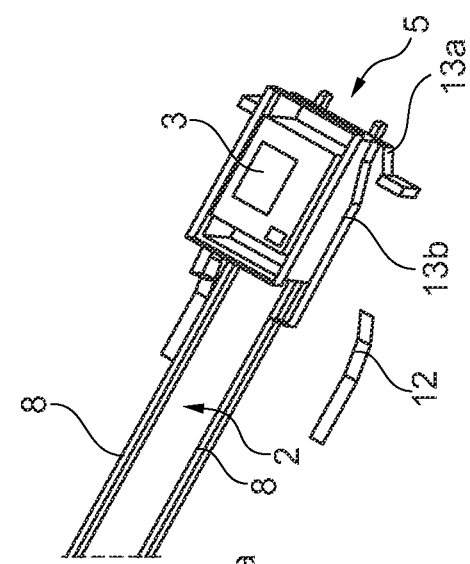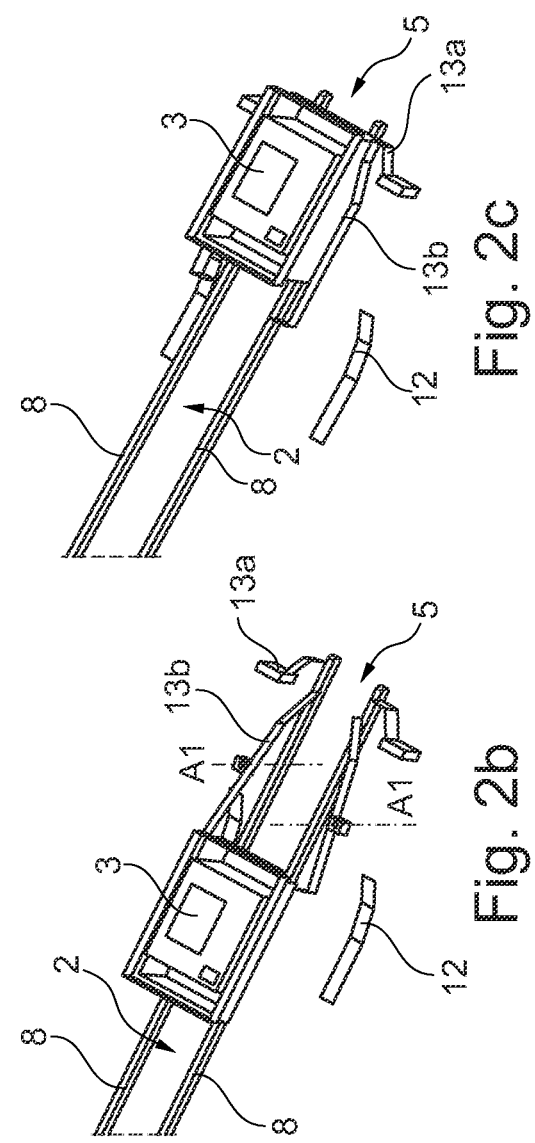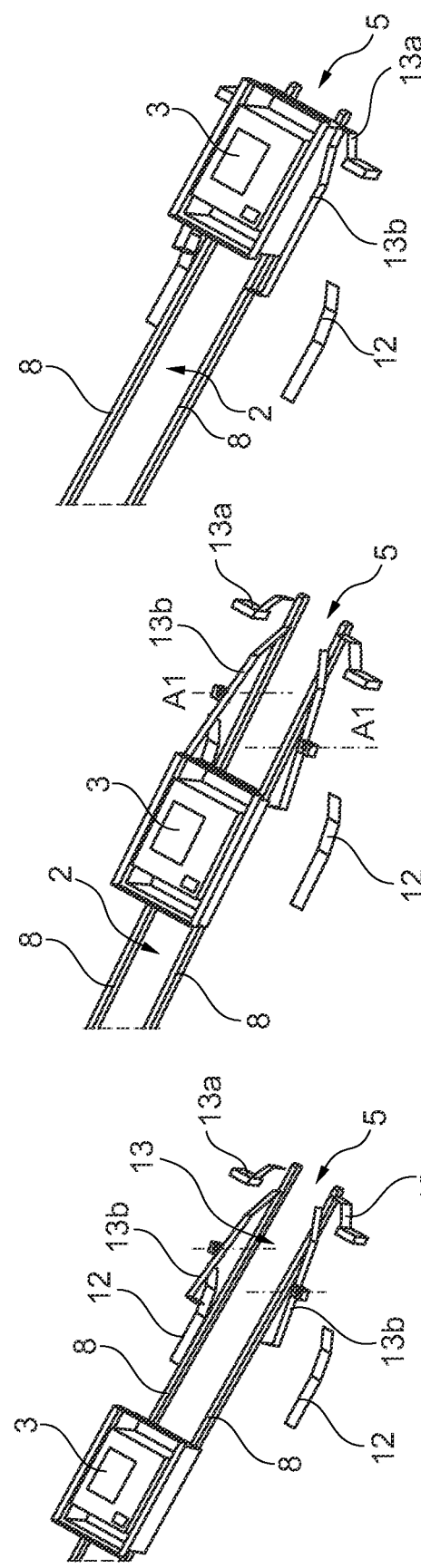

SYSTEM FOR CONVEYING ARTICLES

CROSS REFERENCE TO RELATED APPLICATIONS

This application is the U.S. National Stage of PCT/EP2019/086832 filed on Dec. 20, 2019, which application claims priority under 35 USC § 119 to French Patent Application No. 1873976 filed on Dec. 21, 2018. Both of these applications are hereby incorporated by reference in their entirety.

TECHNICAL FIELD

The invention relates to the field of systems for conveying articles.

The invention relates more particularly to a system for conveying articles, which system comprises an article conveyor extending from an upstream end to a downstream end, and a motor-driven shuttle trolley having an article carrier deck, said trolley being designed to dock with the downstream and upstream ends of the conveyor so as to transfer an article between the trolley and the conveyor.

PRIOR ART

Currently, there exist many systems for conveying articles that use a conveyor and a motor-driven shuttle trolley that co-operate mutually to transfer the articles from the trolley to the conveyor and vice versa.

To that end, Document FR 3 049 481 discloses a system for automatically transferring an article, which is a kit basket in that example, that system including a self-guided mobile trolley having an article carrier deck, and a motor-driven article conveyor having an inlet zone and an outlet zone, each of which zones is equipped with a motor-driven pick-up actuator.

The entire conveying system that is made up of the conveyor, of the pick-up actuator, and of the trolley is motor-driven, which gives rise to a high energy cost.

In addition, that system requires, in particular, additional installation of tracking recognition cells, of power supply sources, and of dedicated communications means in order to be able to operate.

An object of the invention is to remedy those drawbacks by proposing a system that is simplified and more reliable.

SUMMARY OF THE INVENTION

To this end, the invention provides a system for conveying articles, which system comprises an article conveyor extending from an upstream end to a downstream end, and a motor-driven shuttle trolley having an article carrier deck, said trolley being designed to dock with the downstream and upstream ends of the conveyor so as to transfer an article between the trolley and the conveyor, said system for conveying articles being characterized in that the conveyor is a gravity conveyor under which a ramp extends, in that the trolley is suitable for travelling under the conveyor and is provided with a lever that is mounted to move vertically relative to the deck, said lever being designed to co-operate with the ramp while the trolley is moving under the conveyor so that, by following the ramp, the lever moves between a retracted position in which it is retracted under the conveyor and a deployed position in which it projects above the conveyor so as to drive an article along the conveyor, in that the conveyor is provided at its downstream end with a first retractable abutment designed to block an article at the downstream end of the conveyor, and in that the trolley is provided with a pusher member designed to co-operate with the first abutment as it moves under the downstream end of the conveyor so that, on coming into contact with the pusher member, the first abutment is retracted to the sides of the conveyor to allow the article to be transferred to the deck of the trolley.

The idea of the invention consists in using a gravity conveyor as the support or medium on which the articles move, and a shuttle trolley as the energy source for moving the articles along the conveyor.

By means of the system of the invention, the shuttle trolley has a dual function consisting firstly in playing a part in transferring the articles to and from the conveyor, and secondly in playing a part in moving the articles along the conveyor.

By means of the very limited friction of the articles on the gravity conveyor, the energy necessary for the shuttle trolley to move the articles along the conveyor is very low.

The idea also consists in causing the trolley to travel under the conveyor so as to limit the footprint or floor area occupied by the conveyor system while also optimizing the path cycle of the trolley.

The system of the invention also makes it possible to have a conveying speed that is dependent on the speed of movement of the trolley. It is thus simpler to manage the entire stock of articles and the entire fleet of trolleys.

The system of the invention for conveying articles also has the following features:
- the conveyor includes an ascending conveyor portion that extends from its upstream end, the ramp being designed to maintain the lever in the deployed position along said ascending conveyor portion;
- the conveyor includes a descending conveyor portion that extends on from the ascending conveyor portion to the downstream end of the conveyor;
- the descending conveyor portion of the conveyor is provided with a ramp having a slope that goes back up towards the downstream end of the conveyor so as to position the lever from the retracted position to the deployed position;
- the conveyor is provided with a second retractable abutment upstream from the downstream end of the conveyor, said second abutment being designed to be moved between a retracted position in which it allows an article to move towards the downstream end of the conveyor, and a closed position in which it blocks an article upstream from the downstream end of the conveyor, the second abutment having an element projecting over the conveyor and designed to co-operate with an article disposed at the downstream end of the conveyor so as to go from the retracted position to the closed position;
- the deck of the trolley is in the form of a fork and the conveyor is in the form of two parallel sections, the fork being designed to engage comb-like between the sections of the conveyor while the trolley is moving under the upstream end and/or under the downstream end of the conveyor; and
- the lever of the trolley is in the form of a fork designed to engage comb-like between the sections of the conveyor while the trolley is moving under the conveyor.

BRIEF DESCRIPTION OF THE DRAWINGS

The present invention can be better understood and other advantages appear on reading the following detailed description of an embodiment given by way of non-limiting example and with reference to the accompanying drawings, in which:

FIG. 1 is a diagrammatic perspective view of the conveying system of the invention;

FIGS. 2a to 2c are diagrammatic perspective views of the conveyor of the invention while an article is being blocked in a retaining trap of the conveyor by the movements of mutually co-operating parts;

DESCRIPTION OF THE EMBODIMENTS

Figure 3:
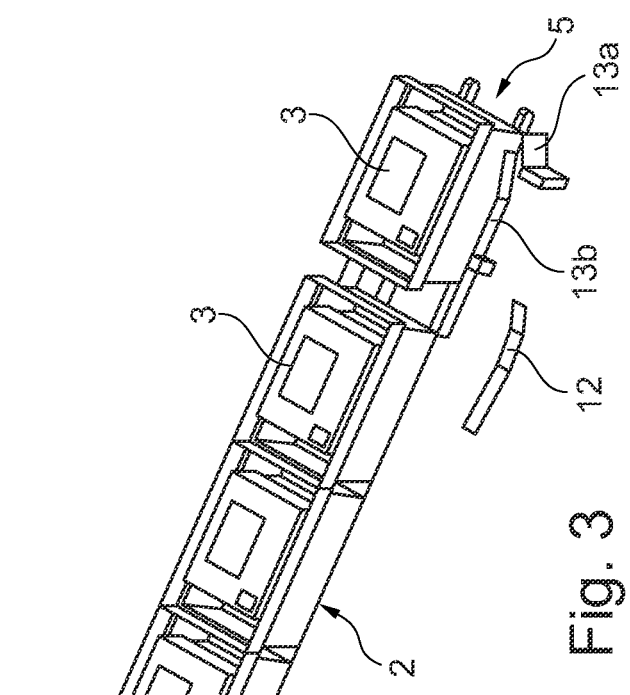
FIG. 3 is a diagrammatic perspective view of the conveyor of the invention at the discharge outlet of the conveyor where articles are waiting to be transferred to the trolley.

FIG. 1 shows a conveying system 1 of the invention comprising a conveyor 2 for conveying articles 3 that extends in a certain conveying direction D1 from an upstream end 4 to a downstream end 5, and at least one motor-driven shuttle trolley 6 having an article carrier deck 7, which shuttle trolley is referred to below as the "trolley" 6.

The trolley 6 and the conveyor 2 of the invention are designed to co-operate mutually so that they firstly transfer an article 3 from the trolley 6 to the conveyor 2 via the upstream end 4 of the conveyor 2, and then, move the article 3 along the conveyor 2 from the upstream end 4 to the downstream end 5, and finally transfer the article 3 to the trolley 6 via the downstream end 5 of the conveyor 2.

It can be understood that the conveying system 1 of the invention is particularly well suited for being integrated into a logistics platform in order to handle and process articles of the packet or parcel type.

In this example, the conveyor 2 of the invention is a gravity conveyor comprising at least two parallel sections 8 that form a conveyor belt 9 and that extend from the upstream end 4 of the conveyor to the downstream end 5 of the conveyor 2.

Each section 8 is provided with limited-friction conveying means, such as free rollers disposed in succession along the sections or indeed a continuous surface having a smooth covering or coating.

The conveyor 2 of the invention shown in FIG. 1 further comprises an ascending conveyor portion PCA that extends from the upstream end 4 and a descending conveyor portion PCD that extends on from the ascending conveyor portion PCA down to the downstream end 5.

The conveyor 2 is also raised so as to leave free space, represented by arrow E1 between the floor S and the conveyor belt 9 of the conveyor 2.

The trolley 6 can thus travel under the conveyor 2 in the conveying direction D1 under the control of a monitoring and control unit 10.

The monitoring and control unit 10 also controls the trolley 6 so that it docks with the upstream end 4 of the conveyor in order to transfer an article 3 onto the conveyor 2, so that the trolley 6 is removed from under the conveyor 2 when it reaches the end of the ascending conveyor portion PCA, and so that another trolley 6 is moved under the descending conveyor portion PCD of the conveyor in order to retrieve the article 3 transferred by the downstream end 5 of the conveyor 2.

Without restricting the scope of the invention, the monitoring and control unit 10 may also cause the same trolley 6 to move along the conveyor 2 from the upstream end 4 to the downstream end 5.

The trolley 6 may thus travel around a closed loop, under the conveyor 2 from the upstream end 4 to the downstream end 5 and outside of the conveyor 2 from the downstream end 5 to the upstream end 4.

For example, the trolley 6 of the invention is of the Automated Guided Vehicle (AGV) type.

The deck 7 of the trolley extends substantially horizontally, in the form of fork prongs or of fingers, and it is designed to engage comb-like with the parallel sections 8 of the conveyor 2 while the trolley 6 is docking with the upstream end 4 of the conveyor, as shown in FIG. 1.

Thus, when the deck 7 engages comb-like with the sections 8 of the conveyor 2, the article 3 stored on the deck 7 is deposited by gravity onto the belt 9 of the conveyor 2.

Also, by means of the space left free under the conveyor 2, the co-operation between the trolley 6 and the conveyor 2 takes place via a ramp 12 that extends under the conveyor 2, and in particular under the upstream end 4, the ascending conveyor portion PCA, and the downstream end 5.

Without restricting the scope of the invention, the ramp 12 may optionally extend over the entire length of the conveyor 2.

The co-operation between the trolley 6 and the ramp 12 takes place via a lever 11 that is hinged to the trolley 6 and that is mounted to move vertically relative to the deck.

The lever 11 is designed to co-operate with the ramp 12 while the trolley 6 is moving under the conveyor 2 in such a manner that, by following the ramp 12, the lever moves from a retracted position in which it retracts under the conveyor 2 to a deployed position in which it extends projecting above the conveyor 2 to drive an article 3 along the conveyor 2.

The lever 11 moves through a slideway on the trolley that constrains it to move vertically.

The lever 11 is hinged to the trolley 6 by means of a connecting rod or link 15 connected to the trolley via a pivot connection. It is the connecting rod that co-operates directly with the ramp 12 while the trolley 6 is moving under the conveyor 2.

The connecting rod and the lever 11 form a hinged assembly that, in this example, is in the shape of a deformable L.

Thus, while the connecting rod 15 is co-operating with the ramp 12, the connecting rod 15 moves the lever 11 downwards as a function of the height of the ramp 12.

Figure 4A:
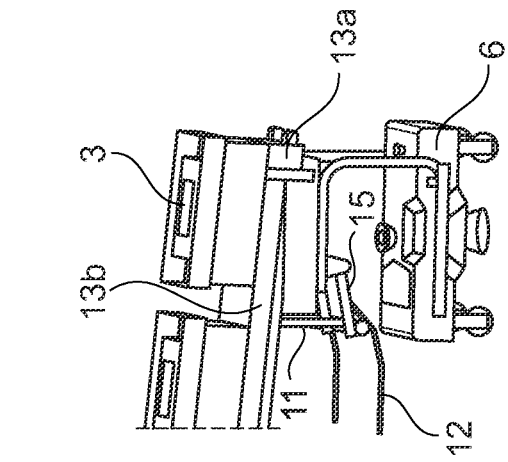
FIGS. 4a to 4d are highly diagrammatic perspective views of the conveyor of the invention while an article is being transferred from the article discharge outlet to a trolley by movements of mutually co-operating parts.
Figure 4B:
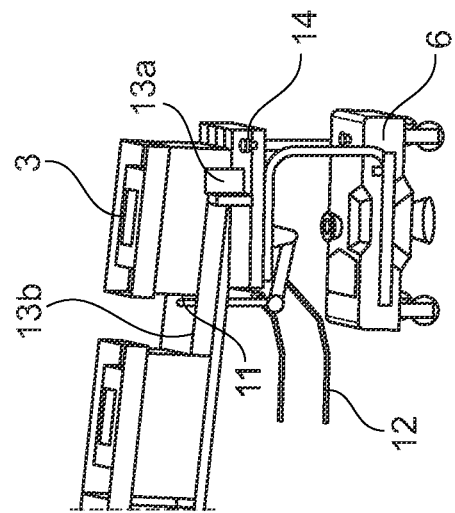

The lever 11 of the trolley 6 is in the form of a fork that is designed to engage comb-like between the strips of the conveyor while the trolley 6 is moving under the conveyor 2, as shown in FIG. 4b.

The lever 11 also forms a back for the deck 7 of the trolley 6 at an angle of about 90° and makes it possible to limit falling of an article 3 as it approaches the upstream end 4 of the conveyor.

In the example shown in FIG. 1, the ramp 12 extends over the entire length of the ascending conveyor portion PCA so as to maintain the lever 11 in the deployed position.

It can also be understood that the ramp 12 can remain substantially horizontal in the form of a rail along the ascending conveyor portion PCA of the conveyor 2 in such a manner that the rising height of the ascending conveyor portion PCA of the conveyor enables the lever 11 to be no longer projecting at the high end of the ascending conveyor portion PCA.

However, it is possible to make provision for the ramp 12 to slope towards the floor S at the high end of the ascending conveyor portion PCA so that the lever 11 is positioned in the retracted position and enables the trolley 6 to be removed from under the conveyor 2.

The downstream end 5 of the conveyor is also provided with a ramp 12 arranged in such manner as to place the lever 11 in the deployed position so as to push an article 3 and so as to transfer it to the trolley 6.

However, before it is pushed by the lever 11, the downstream end 5 of the conveyor 2 is provided, in this example, with a trap 13 for trapping an article 3, which trap has a first retractable abutment 13a and a second retractable abutment 13b.

In this example, the trap 13 makes it possible to transfer the articles 3 one-by-one to a dedicated trolley 6 without using a motor-driven transfer mechanism.

The movements of the mutually co-operating parts for transferring an article 3 at the downstream end 5 via the trap 13 are shown diagrammatically in FIGS. 4a to 4d.

The first abutment 13a arranged at the downstream end of the conveyor is designed to block an article 3 at the downstream end 5 of the conveyor 2.

The trolley 6 is provided with a pusher member 14 that is designed to co-operate with the first abutment 13a while it is moving under the downstream end 5 of the conveyor 2 in such a manner that, on coming into contact with the pusher member 14, the first abutment 13a is retracted to the sides of the conveyor 2 to allow the article 3 to be transferred to the deck 7 of the trolley 6.

The second abutment 13b is arranged upstream from the downstream end 5 of the conveyor 2.

The second abutment 13b is designed to be moved between a retracted position in which it allows an article 3 to move towards the downstream end 5 of the conveyor 2 and a closed position in which it blocks an article 3 upstream from the downstream end 5 of the conveyor 2.

The second abutment 13b also has a projecting portion that projects over the downstream end 5 of the conveyor 2 in such a manner that the projection co-operates with an article 3 disposed at the downstream end 5 of the conveyor 2.

Thus, when an article presses against the projection, the second abutment goes from the retracted position to the closed position. In this example, the return from the closed position to the retracted position takes place by resilient return.

For example, the second abutment 13b may be formed of pincers comprising two arms that extend on either side of the conveyor 2 along the downstream end 5 of the conveyor and that are mounted to move about respective axes A1.

The projecting portion of the pincers is situated closer to the downstream end 5 of the conveyor.

Thus, when an article 3 presses against the projection of the second abutment 13b, the abutment 13b goes from its retracted position to its closed position.

Figure 4C:
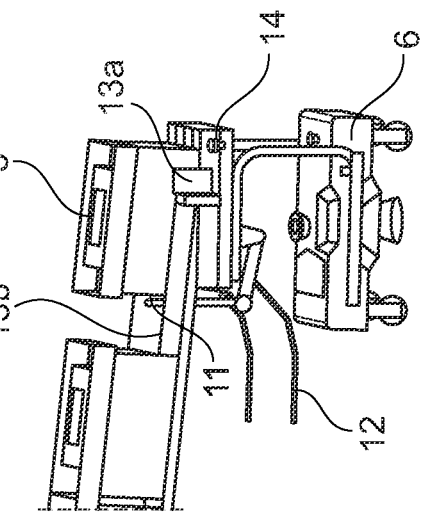
Figure 4D:
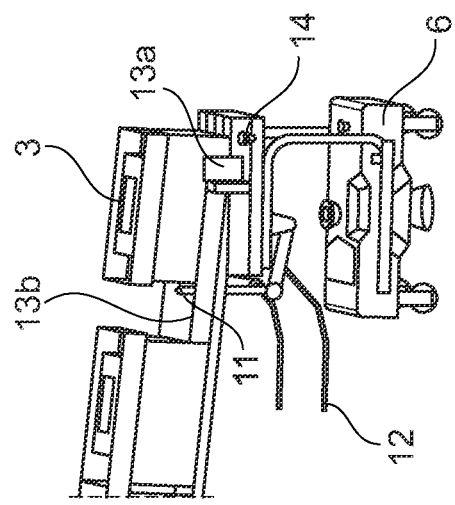

The trap 13 of the invention thus has:
- a first position, shown in FIGS. 2a and 2b, in which position the first abutment 13a is retracted so as to allow an article to be inserted into the trap 13, and in which position the second abutment 13b is in the closed position so as to prevent any article transfer;
- a second position, shown in FIGS. 2c, 3, and 4a, in which position the first and second abutments 13a and 13b are closed so as to block the article 3 in the trap 13 and so as to retain the articles 3 that are sliding by gravity upstream on the conveyor 2; and
- a third position, as shown in FIGS. 4b to 4d, in which position the first abutment 13a blocks the articles 3 upstream on the conveyor 2 and in which the second abutment 13b is in the retracted position so as to enable the article 3 to be discharged via the downstream end 5.

What is claimed is:

1. A system for conveying articles, which system comprises an article conveyor extending from an upstream end to a downstream end, and a motor-driven shuttle trolley having an article carrier deck, said trolley being designed to dock with the downstream and upstream ends of the conveyor so as to transfer an article between the trolley and the conveyor, wherein the conveyor is a gravity conveyor under which a ramp extends, in that the trolley is suitable for travelling under the conveyor and is provided with a lever that is mounted to move vertically relative to the deck, said lever being designed to co-operate with the ramp while the trolley is moving under the conveyor so that, by following the ramp, the lever moves between a retracted position in which it is retracted under the conveyor and a deployed position in which it projects above the conveyor so as to drive an article along the conveyor, in that the conveyor is provided at its downstream end with a first retractable abutment designed to block an article at the downstream end of the conveyor, and in that the trolley is provided with a pusher member designed to co-operate with the first abutment as it moves under the downstream end of the conveyor so that, on coming into contact with the pusher member, the first abutment is retracted to the sides of the conveyor to allow the article to be transferred to the deck of the trolley.

2. The system for conveying articles according to claim 1, wherein the conveyor includes an ascending conveyor portion (PCA) that extends from its upstream end, and in that the ramp is designed to maintain the lever in the deployed position along said ascending conveyor portion.

3. The system for conveying articles according to claim 2, wherein the conveyor includes a descending conveyor portion (PCD) that extends on from the ascending conveyor portion to the downstream end of the conveyor.

4. The system for conveying articles according to claim 3, wherein the descending conveyor portion of the conveyor is provided with a ramp having a slope that goes back up towards the downstream end of the conveyor so as to position the lever from the retracted position to the deployed position.

5. The system for conveying articles according to claim 3, wherein the conveyor is provided with a second retractable abutment upstream from the downstream end of the conveyor, said second abutment being designed to be moved between a retracted position in which it allows an article to move towards the downstream end of the conveyor, and a closed position in which it blocks an article upstream from the downstream end of the conveyor, the second abutment having an element projecting over the conveyor and designed to co-operate with an article disposed at the downstream end of the conveyor so as to go from the retracted position to the closed position.

6. The system for conveying articles according to claim 3, wherein the deck of the trolley is in the form of a fork and the conveyor is in the form of two parallel sections, the fork being designed to engage comb-like between the sections of the conveyor while the trolley is moving under the upstream end and/or under the downstream end of the conveyor.

7. The system for conveying articles according to claim 3, wherein the lever of the trolley is in the form of a fork designed to engage comb-like between the sections of the conveyor while the trolley is moving under the conveyor.

8. The system for conveying articles according to claim 1, wherein the conveyor includes a descending conveyor portion (PCD) that extends on from an ascending conveyor portion to the downstream end of the conveyor.

9. The system for conveying articles according to claim 1, wherein a descending conveyor portion of the conveyor is provided with a ramp having a slope that goes back up towards the downstream end of the conveyor so as to position the lever from the retracted position to the deployed position.

10. The system for conveying articles according to claim 1, wherein the conveyor is provided with a second retractable abutment upstream from the downstream end of the conveyor, said second abutment being designed to be moved between a retracted position in which it allows an article to move towards the downstream end of the conveyor, and a closed position in which it blocks an article upstream from the downstream end of the conveyor, the second abutment having an element projecting over the conveyor and designed to co-operate with an article disposed at the downstream end of the conveyor so as to go from the retracted position to the closed position.

11. The system for conveying articles according to claim 1, wherein the deck of the trolley is in the form of a fork and the conveyor is in the form of two parallel sections, the fork being designed to engage comb-like between the sections of the conveyor while the trolley is moving under the upstream end and/or under the downstream end of the conveyor.

12. The system for conveying articles according to claim 1, wherein the lever of the trolley is in the form of a fork designed to engage comb-like between the sections of the conveyor while the trolley is moving under the conveyor.

\* \* \* \* \*